(12) United States Patent
Nishikoori

(10) Patent No.: US 12,337,400 B2
(45) Date of Patent: Jun. 24, 2025

(54) ROTARY TOOL AND METHOD FOR MANUFACTURING MACHINED PRODUCT

(71) Applicant: KYOCERA CORPORATION, Kyoto (JP)

(72) Inventor: Hironori Nishikoori, Yasu (JP)

(73) Assignee: KYOCERA CORPORATION, Kyoto (JP)

( * ) Notice: Subject to any disclaimer, the term of this patent is extended or adjusted under 35 U.S.C. 154(b) by 225 days.

(21) Appl. No.: 17/913,432

(22) PCT Filed: Mar. 24, 2021

(86) PCT No.: PCT/JP2021/012197
§ 371 (c)(1),
(2) Date: Sep. 22, 2022

(87) PCT Pub. No.: WO2021/193705
PCT Pub. Date: Sep. 30, 2021

(65) Prior Publication Data
US 2023/0373019 A1    Nov. 23, 2023

(30) Foreign Application Priority Data

Mar. 25, 2020    (JP) ................... 2020-054294

(51) Int. Cl.
*B23C 5/10*    (2006.01)

(52) U.S. Cl.
CPC ...... *B23C 5/109* (2013.01); *B23C 2200/0411* (2013.01); *B23C 2200/083* (2013.01); *B23C 2200/203* (2013.01); *B23C 2210/202* (2013.01)

(58) Field of Classification Search
CPC ............. B23C 5/109; B23C 2200/203; B23C 2200/083; B23C 2200/369; B23C 2200/0411; B23C 2210/202; B23C 5/202; B23C 5/1027; B23C 5/2208; B23C 5/2243

See application file for complete search history.

(56) References Cited

U.S. PATENT DOCUMENTS 9,101,989 B2    8/2015   Ishi et al.
9,511,427 B2 *  12/2016  Horiike ............... B23B 27/1611
11,285,550 B2 * 3/2022   Tabe .................... B23C 5/2213
(Continued)

FOREIGN PATENT DOCUMENTS

JP    2010523352 A    7/2010
JP    2013176834 A    9/2013
(Continued)

*Primary Examiner* — Sara Addisu
(74) *Attorney, Agent, or Firm* — HAUPTMAN HAM, LLP

(57) ABSTRACT

A rotary tool may include a holder and a cutting insert. The cutting insert may include an upper surface including a first upper side, a lower surface including a first lower side, and a lateral surface. The lateral surface may include a first lateral surface, a second lateral surface, and a third lateral surface. The first upper side may include a first end. The first end may be located closer to the third lateral surface than the second lateral surface. The first lower side may include a second end. The second end may be located closer to the second lateral surface than the third lateral surface. In a front view of the upper surface, the first lateral surface may include a tip region surrounded by the first end and the second end, and the tip region may be recessed toward the rear end.

21 Claims, 16 Drawing Sheets

(56) References Cited

U.S. PATENT DOCUMENTS

| | | | |
|---|---|---|---|
| 11,583,943 B2* | 2/2023 | Aso | B23C 5/109 |
| 2005/0063792 A1* | 3/2005 | Satran | B23C 5/2213 |
| | | | 407/113 |
| 2010/0054873 A1* | 3/2010 | Men | B23C 5/2213 |
| | | | 407/42 |
| 2010/0080662 A1 | 4/2010 | Satran et al. | |
| 2011/0129309 A1* | 6/2011 | Kovac | B23C 5/2213 |
| | | | 407/103 |
| 2012/0009029 A1 | 1/2012 | Saji | |
| 2012/0039678 A1* | 2/2012 | Nguyen | B23C 5/109 |
| | | | 407/113 |
| 2013/0129432 A1* | 5/2013 | Jaeger | B23C 5/202 |
| | | | 407/42 |
| 2014/0010605 A1 | 1/2014 | Smilovici et al. | |
| 2014/0178135 A1* | 6/2014 | Yamamoto | B23C 5/202 |
| | | | 407/42 |
| 2014/0334890 A1* | 11/2014 | Takahashi | B23C 5/205 |
| | | | 407/40 |
| 2016/0375506 A1 | 12/2016 | Koike et al. | |
| 2019/0047059 A1* | 2/2019 | Shiroma | B23C 5/109 |
| 2019/0061024 A1* | 2/2019 | Shiroma | B23C 5/109 |
| 2022/0203459 A1* | 6/2022 | Tsujimoto | B23C 5/109 |
| 2023/0132425 A1* | 5/2023 | Nishikoori | B23C 5/202 |
| | | | 407/113 |

FOREIGN PATENT DOCUMENTS

| | | | | |
|---|---|---|---|---|
| JP | 2015521958 A | | 8/2015 | |
| JP | 2016163911 A | * | 9/2016 | B23C 5/109 |
| KR | 10-2013-0018892 A | | 2/2013 | |
| WO | 2010114094 A1 | | 10/2010 | |
| WO | WO-2011122676 A1 | * | 10/2011 | B23C 5/109 |
| WO | WO-2013051449 A1 | * | 4/2013 | B23B 27/145 |
| WO | WO-2013088851 A1 | * | 6/2013 | B23C 5/109 |
| WO | 2015174200 A1 | | 11/2015 | |

\* cited by examiner

ROTARY TOOL AND METHOD FOR MANUFACTURING MACHINED PRODUCT

CROSS-REFERENCE TO RELATED APPLICATION

This application is a national stage entry according to 35 U.S.C. 371 of PCT Application No. PCT/JP2021/012197 filed on Mar. 24, 2021, which claims priority to Japanese Application No. 2020-054294 filed Mar. 25, 2020. The contents of this Japanese application are incorporated herein by reference in their entirety.

TECHNICAL FIELD

The present disclosure may generally relate to a rotary tool and a method for manufacturing a machined product, which are used for a cutting process of a workpiece. More specifically, the present disclosure may relate to a milling tool used in, for example, a milling process.

BACKGROUND

For example, cutting tools is discussed in WO 2010/114094 (Patent Document 1), WO 2015/174200 (Patent Document 2) and Japanese Unexamined Patent Publication No. 2010-523352 (Patent Document 3) as a rotary tool (cutting tool) used in a cutting process of a workpiece, such as metal. The cutting tool discussed in Patent Document 3 may include a cutting insert. The cutting insert may include two end surfaces (an upper surface and a lower surface), a peripheral surface, and cutting edges (an upper cutting edge and a lower cutting edge) formed on an intersection of the end surfaces and the peripheral surface. The cutting edges may have a convex shape protruding toward a front end of a rotation axis, and may include a major cutting edge located outside and a minor cutting edge located inside on the basis of an end part of the convex shape. The peripheral surface may include a region that connects an end part of the upper cutting edge and an end part of the lower cutting edge. The region linearly may connect these two end parts. Therefore, an outer peripheral edge connecting these two end parts may have a straight line shape in a top view of the cutting insert.

In a cutting process using the cutting tool discussed in Cited Document 3, it is necessary to set an axial rake to a large negative value in order to avoid the region in the peripheral surface from coming into contact with a workpiece. In other words, it is necessary to bend the cutting insert largely forward. However, if the cutting insert is bent largely forward, cutting performance may be lowered.

SUMMARY

A rotary tool in a non-limiting aspect of the present disclosure may extend along a rotation axis from a rear end toward a front end, and may include a holder and a cutting insert. The holder may have a columnar shape extending along the rotation axis, and may include a pocket located on a side of the front end. The cutting insert may be located in the pocket. The cutting insert may include an upper surface, a lower surface, a lateral surface, an upper cutting edge and a lower cutting edge. The upper surface may be located ahead in a rotation direction of the rotation axis, and may include a first upper side located on a side of the front end. The lower surface may be located on a side opposite to the upper surface, and may include a first lower side located on a side of the front end. The lateral surface may be located between the upper surface and the lower surface. The upper cutting edge may be located on the first upper side. The lower cutting edge may be located on the first lower side. The lateral surface may include a first lateral surface located on a side of the front end, a second lateral surface located on an outer peripheral side of the holder, and a third lateral surface located on an inner peripheral side of the holder. The first upper side may have a convex shape protruding toward the front end, and may include a first end located on a side of the front end. The first end may be located closer to the third lateral surface than the second lateral surface. The first lower side may have a convex shape protruding toward the front end, and may include a second end located on a side of the front end. The second end may be located closer to the second lateral surface than the third lateral surface. In a front view of the upper surface, the first lateral surface may include a tip region surrounded by the first end and the second end, and the tip region may be recessed toward the rear end.

EMBODIMENTS

<Rotary Tools>

Figure 1:
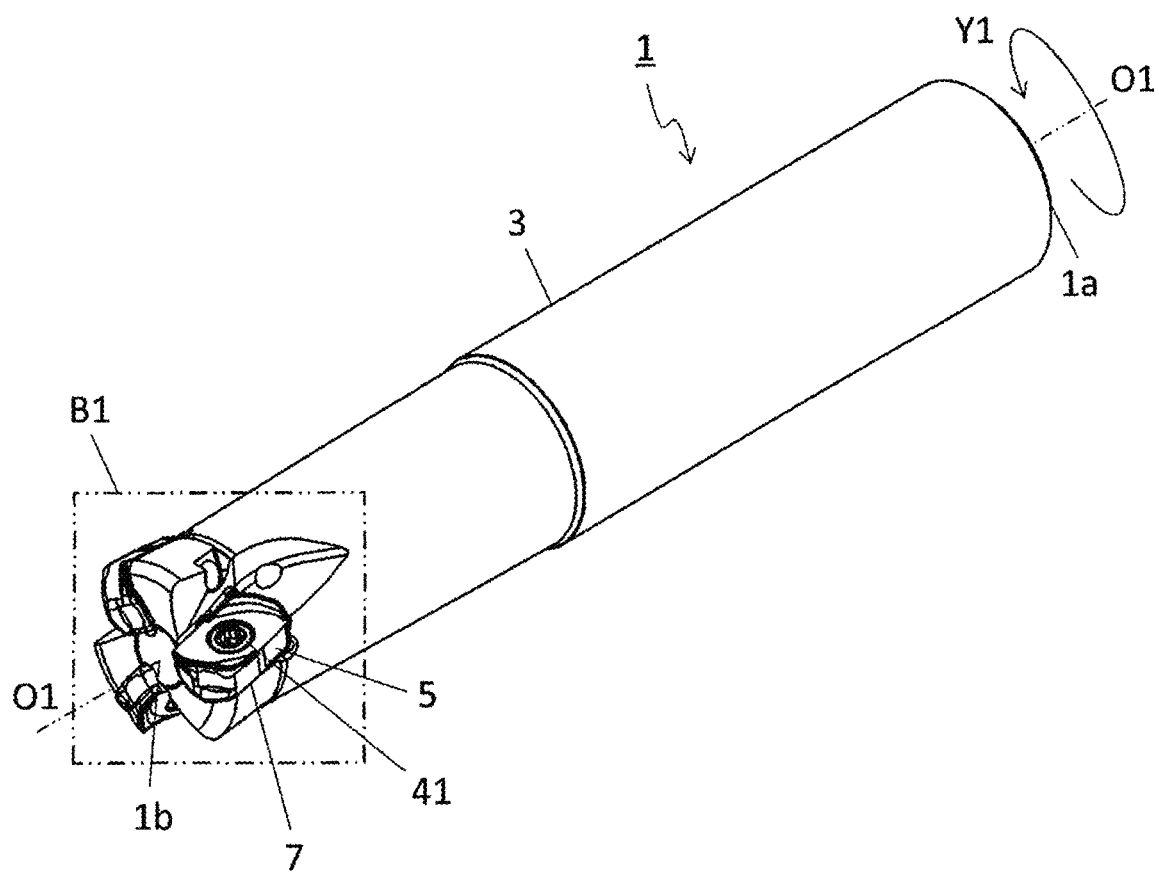
FIG. 1 is a perspective view illustrating a rotary tool in a non-limiting embodiment of the present disclosure.

A rotary tool 1 in a non-limiting embodiment of the present disclosure may be described in detail with reference to the drawings. For convenience of description, the drawings referred to in the following may illustrate, in simplified form, only main members necessary for describing the embodiments. The rotary tool 1 may therefore include any arbitrary structural member not illustrated in the drawings referred to. Dimensions of the members in each of the drawings may faithfully represent neither dimensions of actual structural members nor dimensional ratios of these members.

The rotary tool 1 may be extended along a rotation axis O1 from a rear end 1a to a front end 1b as in a non-limiting embodiment illustrated in FIGS. 1 to 5. The rotary tool 1 may be rotatable around the rotation axis O1. The rotary tool 1 may be a milling tool used in, for example, a milling process. An arrow Y1 in FIG. 1 and the like may indicate a rotation direction of the rotation axis O1.

The rotary tool 1 may include a holder 3 and a cutting insert 5 (hereinafter also referred to as "an insert 5").

The holder 3 may have a columnar shape extending along the rotation axis O1. The columnar shape may be an approximately columnar shape, but need not be a strict columnar shape. The holder 3 may include a pocket 7 located on a side of the front end 1b. The pocket 7 may be a part to which the insert 5 is attachable. The pocket 7 may open into an outer peripheral surface and an end surface on a side of the front end 1b in the holder 3.

The insert 5 may be located in the pocket 7. There may be one or a plurality of pockets 7. If the holder 3 includes the plurality of pockets 7 as in the non-limiting embodiment illustrated in FIG. 2, the rotary tool 1 may include a plurality of inserts 5, and the inserts 5 may be located one by one in the pockets 7.

In cases where the holder 3 includes the plurality of pockets 7, these pockets 7 may be located around the rotation axis O1 at equal intervals or unequal intervals.

The holder 3 is not limited to a specific size. For example, a length of the holder 3 in a direction along the rotation axis O1 may be set to approximately 60-300 mm. A width (diameter) of the holder 3 in a direction orthogonal to the rotation axis O1 may be set to approximately 8-40 mm.

The insert 5 may include an upper surface 9, a lower surface 11, a lateral surface 13, an upper cutting edge 15 and a lower cutting edge 17 as in a non-limiting embodiment illustrated in FIGS. 6 to 13. As used herein, the terms "the upper surface 9" and "the lower surface 11" may be used for the sake of convenience, but do not indicate upper and lower directions. For example, the upper surface 9 need not be directed upward when using the insert 5. These points may also be true for other parts including expressions of upper and lower.

Figure 2:
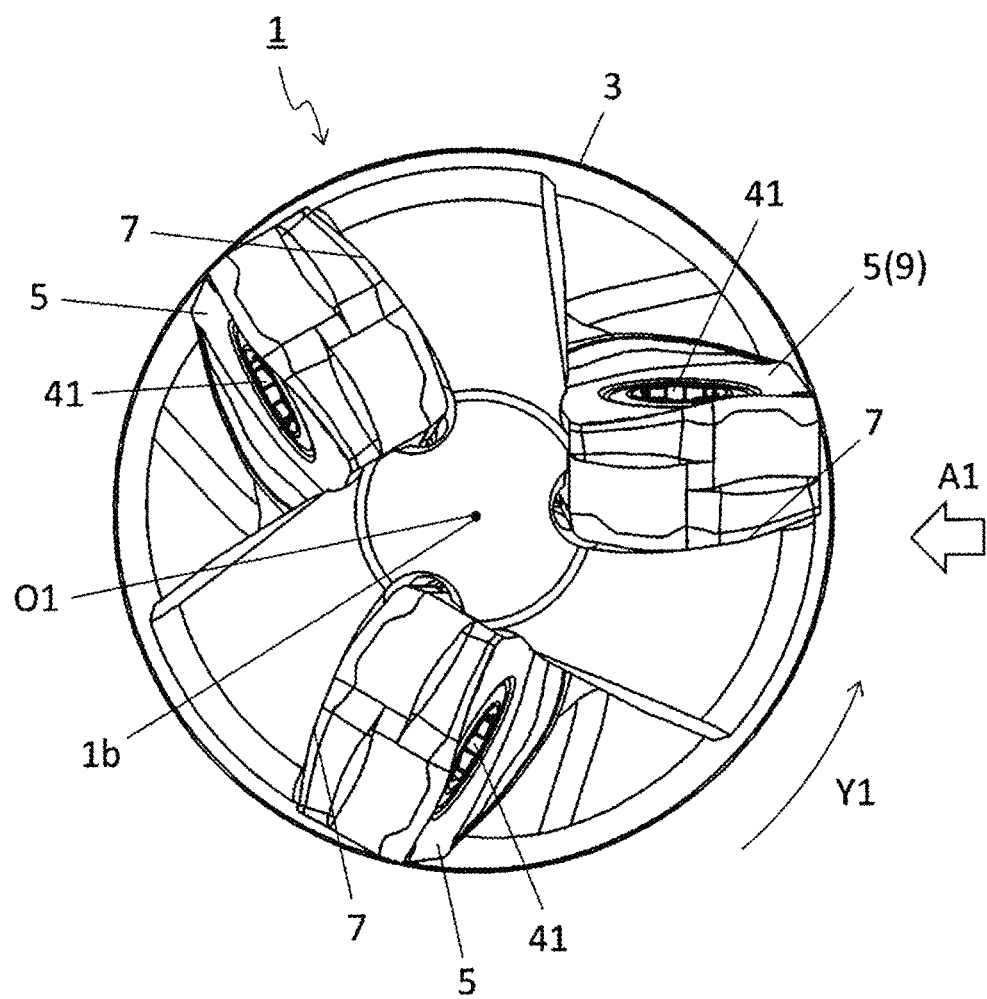
FIG. 2 is a plan view of the rotary tool illustrated in FIG. 1 as viewed from a side of a front end.
Figure 3:
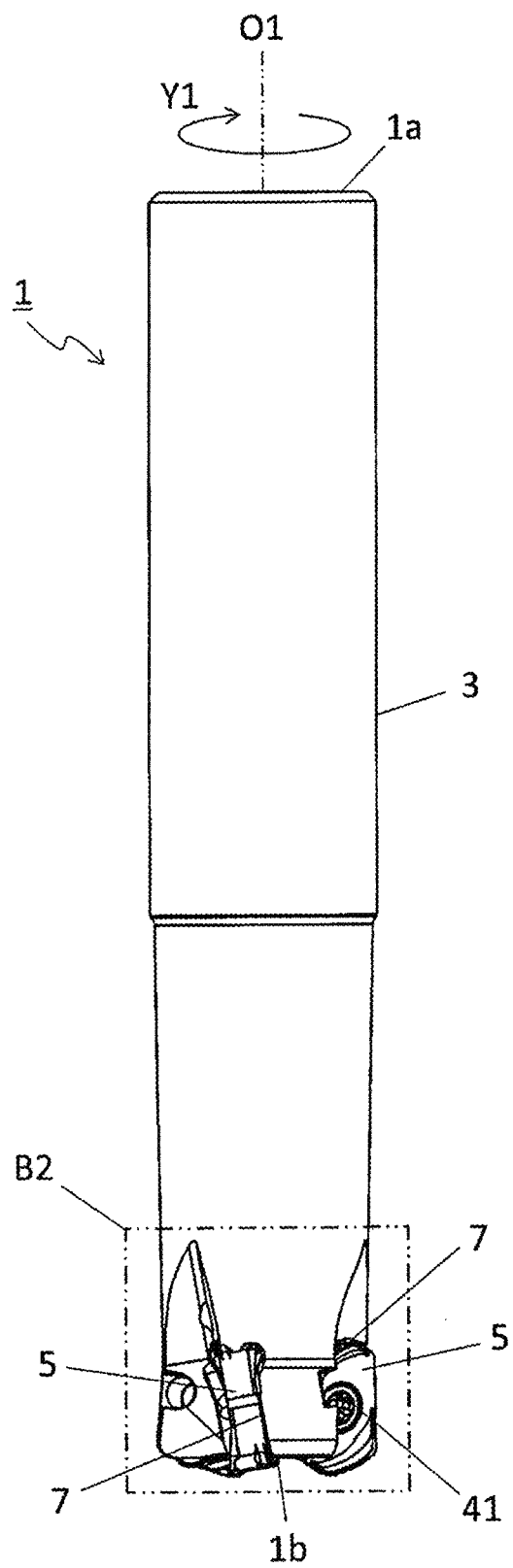
FIG. 3 is a side view of the rotary tool illustrated in FIG. 2 as viewed from an A1 direction.
Figure 4:
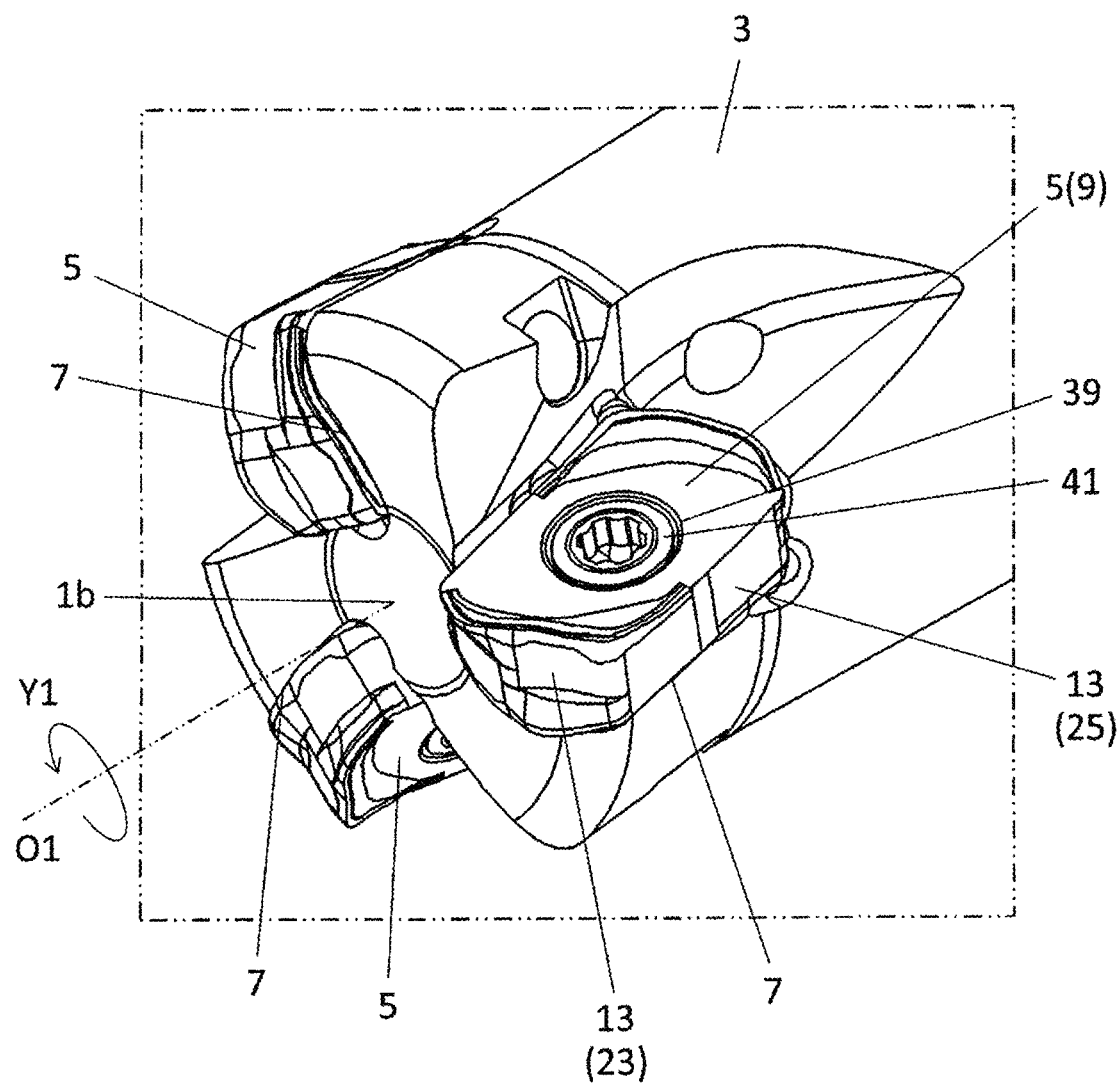
FIG. 4 is an enlarged view of a region B1 illustrated in FIG. 1.
Figure 5:
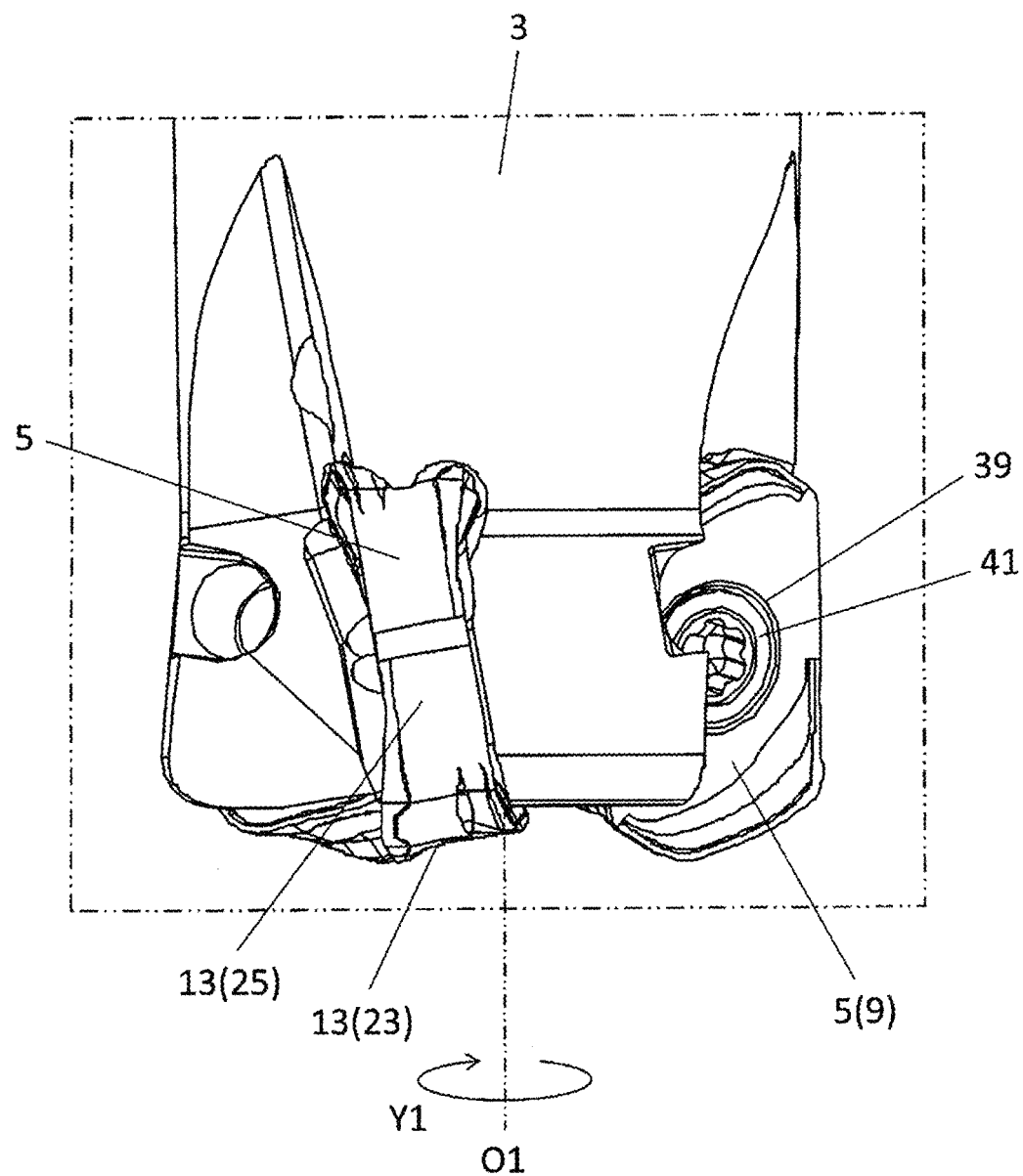
FIG. 5 is an enlarged view of a region B2 illustrated in FIG. 3.
Figure 6:
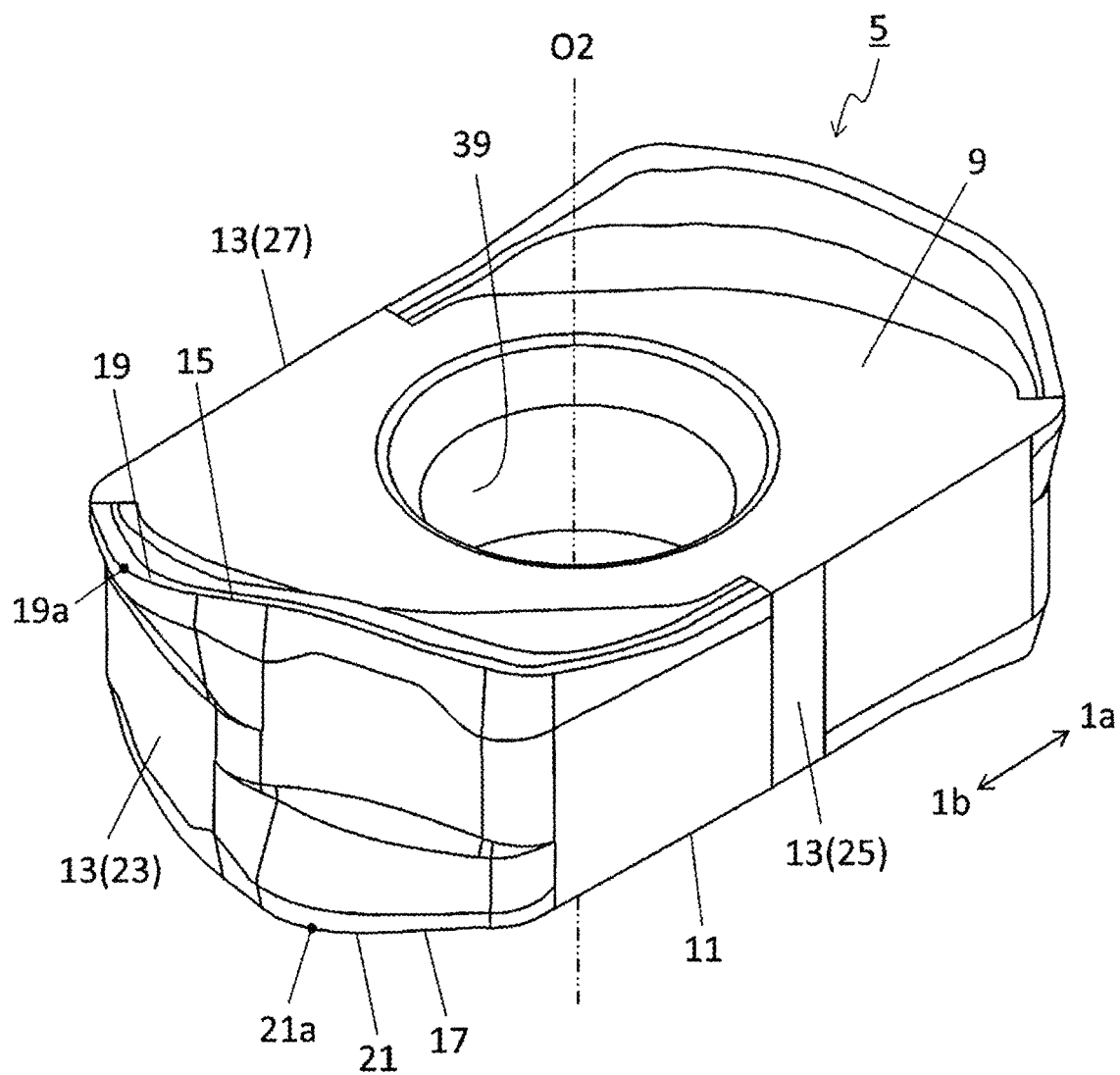
FIG. 6 is a perspective view illustrating a cutting insert of the rotary tool illustrated in FIG. 1.

The upper surface 9 may be located ahead in the rotation direction Y1 of the rotation axis O1 as in the non-limiting embodiment illustrated in FIG. 2. The upper surface 9 may have a polygonal shape. The upper surface 9 may have an approximately quadrangular shape (rectangular shape) as in the non-limiting embodiment illustrated in FIG. 6.

The lower surface 11 may be located on a side opposite to the upper surface 9. Similarly to the upper surface 9, the lower surface 11 may have a polygonal shape. The lower surface 11 may have an approximately quadrangular shape (rectangular shape). The insert 5 may have a polygonal plate shape. The insert 5 may have a quadrangular plate shape.

The polygonal shape need not be a strict polygonal shape. For example, a plurality of sides in the upper surface 9 need not be individually a straight line, but may be curved in a front view (top view) of the upper surface 9. Corners of the upper surface 9 individually located between the sides adjacent to each other need not be a strict corner. In other words, the plurality of corners in the upper surface 9 need not be a strict corner. The corners may be a convex curvilinear shape or a combined shape made up of a straight line and a curved line in a front view of the upper surface 9.

The plurality of sides of the upper surface 9 may include a first upper side 19. That is, the upper surface 9 may include the first upper side 19. The first upper side 19 may be located on a side of the front end 1b. In cases where the upper surface 9 has a quadrangular shape including long sides and short sides, the first upper side 19 may be the short side.

The plurality of sides of the lower surface 11 may include a first lower side 21. That is, the lower surface 11 may include the first lower side 21. The first lower side 21 may be located on a side of the front end 1b. In cases where the lower surface 11 has a quadrangular shape including long sides and short sides, the first lower side 21 may be the short side.

An imaginary straight line passing through a center of the upper surface 9 and a center of the lower surface 11 may be a central axis O2 of the insert 5. If the upper surface 9 has the quadrangular shape, a point of intersection of diagonals in the upper surface 9 may be regarded as the center of the upper surface 9. Similarly, if the lower surface 11 has the quadrangular shape, a point of intersection of diagonals in the lower surface 11 may be regarded as the center of the lower surface 11. A starting point of the diagonals may be a portion where extension lines of individual sides constituting the quadrangular shape intersect with each other.

The shapes of the upper surface 9 and the lower surface 11 are not limited to the quadrangular shape, but may have other shapes. Examples of the other shapes may include triangle shape, pentagon shape, hexagon shape and octagon shape. If the upper surface 9 does not have the quadrangular shape, the center of the upper surface 9 may be determined by, for example, a gravity position of the upper surface 9 in a front view of the upper surface 9. Similarly, if the lower surface 11 does not have the quadrangular shape, the center of the lower surface 11 may be determined by, for example, a gravity position of the lower surface 11 in a front view (bottom view) of the lower surface 11.

The upper surface 9 may have 180° rotational symmetry around the central axis O2 in a front view of the upper surface 9. The lower surface 11 may have 180° rotational symmetry around the central axis O2 in a front view of the lower surface 11.

The insert 5 is not limited to a specific size. For example, a maximum width in a front view of the upper surface 9 may be set to approximately 6-25 mm. A height from the upper surface 9 to the lower surface 11 may be set to approximately 1-10 mm. The height from the upper surface 9 to the lower surface 11 may denote a maximum value of a distance between the upper surface 9 and the lower surface 11 in a direction parallel to the central axis O2. The height from the upper surface 9 to the lower surface 11 may be rephrased as a width of the lateral surface 13 in a direction along the central axis O2.

The lateral surface 13 may be located between the upper surface 9 and the lower surface 11. The lateral surface 13 may connect to the upper surface 9 and the lower surface 11 as in a non-limiting embodiment illustrated in FIG. 10.

The upper cutting edge 15 may be located on the first upper side 19. The upper cutting edge 15 is usable for cutting out a workpiece if a machined product is manufactured using the insert 5. The upper cutting edge may be located throughout the first upper side 19, or alternatively may be located only a part of the first upper side 19.

If the insert 5 includes the upper cutting edge 15, one of the upper surface 9 and the lateral surface 13 may include a rake surface region or a flank surface region. The upper surface 9 may include the rake surface region, and the lateral surface 13 may include the flank surface region as in the non-limiting embodiment illustrated in FIG. 6.

The lower cutting edge 17 may be located on the first lower side 21. The lower cutting edge 17 is usable for cutting out a workpiece if a machined product is manufactured using the insert 5. The lower cutting edge 17 may be located throughout the first lower side 21, or alternatively may be located only a part of the first lower side 21. If the insert 5 includes the upper cutting edge 15 and the lower cutting edge 17, the insert having a double-sided specification is obtainable.

The lateral surface 13 may include a first lateral surface 23, a second lateral surface 25 and a third lateral surface 27. The first lateral surface 23 may be located on a side of the front end 1b. The second lateral surface 25 may be located on an outer peripheral side of the holder 3 if a machined product is manufactured using the upper cutting edge 15. The third lateral surface 27 may be located on an inner peripheral side of the holder 3 if a machined product is manufactured using the upper cutting edge 15. The second lateral surface 25 and the third lateral surface 27 may be located along the rotation axis O1. The third lateral surface 27 may be located on a side opposite to the second lateral surface 25.

In cases where a machined product is manufactured using the lower cutting edge 17, the insert 5 may be attached to the holder 3 in a state where the insert 5 is turned around, compared with cases where a machined product is manufactured using the upper cutting edge 15. Therefore, the third lateral surface 27 may be located on the outer peripheral side of the holder 3 if a machined product is manufactured using the lower cutting edge 17. The second lateral surface 25 may be located on the inner peripheral side of the holder 3 if a machined product is manufactured using the lower cutting edge 17.

The first upper side 19 may have a convex shape protruding toward the front end 1b. The first upper side 19 may include a first end 19a located on a side of the front end 1b. More specifically, the first upper side 19 may include the first end 19a located closest to the front end 1b on the first upper side 19. The first end 19a may be located closer to the third lateral surface 27 than the second lateral surface 25. In other words, a distance between the first end 19a and the third lateral surface 27 may be smaller than a distance between the first end 19a and the second lateral surface 25.

A part of the upper cutting edge 15 which is located close to the first end 19a is usable as an end cutting edge located along a machined surface (finished surface) of a workpiece if a machined product is manufactured using the upper cutting edge 15. A part of the upper cutting edge 15 which is located from the first end 19a to the second lateral surface 25 is usable as a so-called major cutting edge that mainly cuts out a workpiece if a machined product is manufactured using the upper cutting edge 15. A part of the upper cutting edge which is located from the first end 19a to the third lateral surface 27 is usable as a ramping edge if a ramping process is carried out using the upper cutting edge 15.

The first lower side 21 may have a convex shape protruding toward the front end 1b. The first lower side 21 may include a second end 21a located on a side of the front end 1b. More specifically, the first lower side 21 may include the second end 21a located closest to the front end 1b on the first lower side 21. The second end 21a may be located closer to the second lateral surface than the third lateral surface 27. In other words, a distance between the second end 21a and the second lateral surface 25 may be smaller than a distance between the second end 21a and the third lateral surface 27.

A part of the lower cutting edge 17 which is located close to the second end 21a is usable as an end cutting edge located along a machined surface (finished surface) of a workpiece if a machined product is manufactured using the lower cutting edge 17. A part of the lower cutting edge 17 which is located from the second end 21a to the third lateral surface 27 is usable as a so-called major cutting edge that mainly cuts out a workpiece if a machined product is manufactured using the lower cutting edge 17. A part of the lower cutting edge 17 which is located from the second end 21a to the second lateral surface 25 is usable as a ramping edge if a ramping process is carried out using the lower cutting edge 17.

Figure 7:
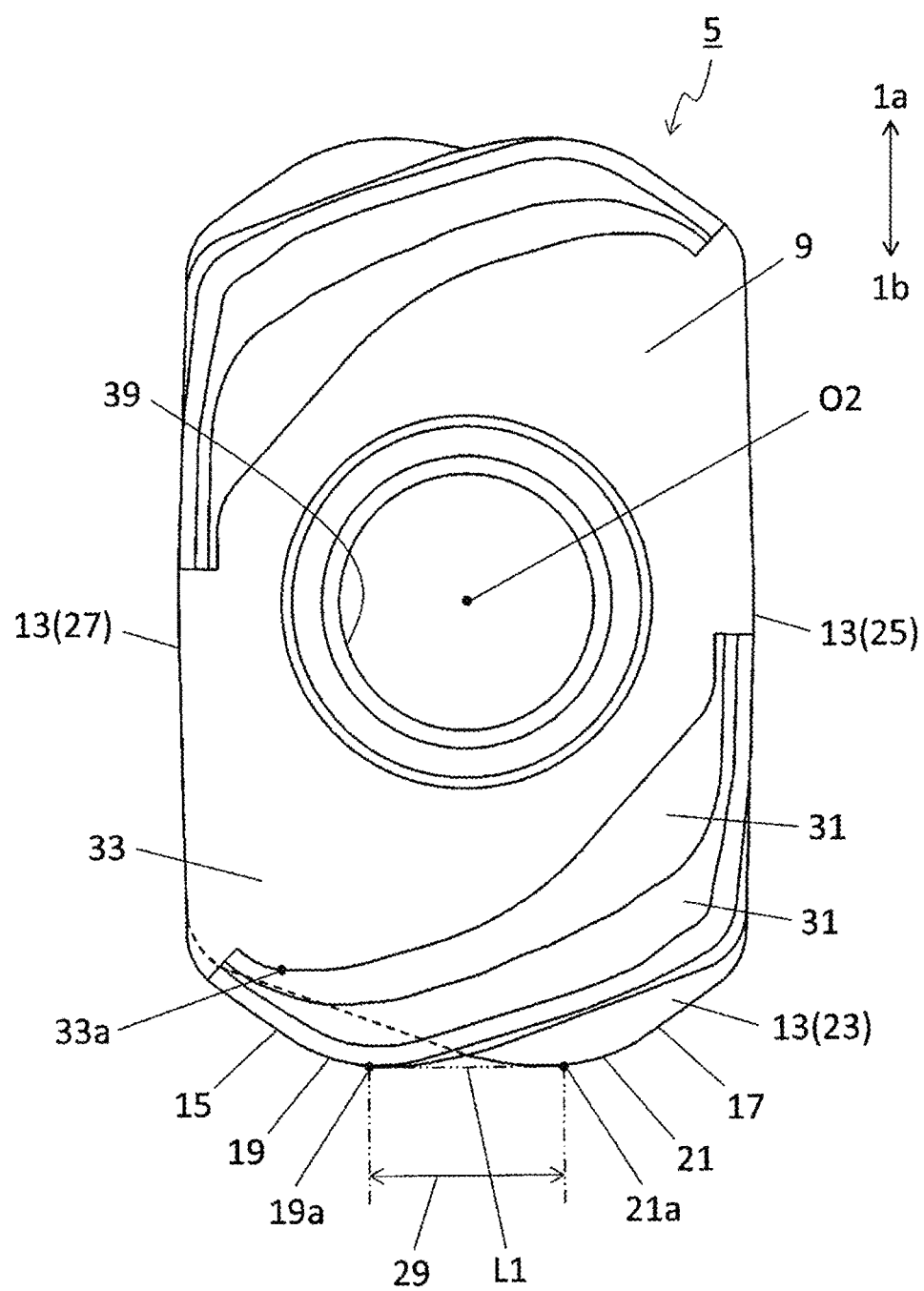
FIG. 7 is a plan view of the cutting insert illustrated in FIG. 6 as viewed from above.

The first lateral surface 23 may include a tip region 29 surrounded by the first end 19a and the second end 21a in a front view of the upper surface 9 as in a non-limiting embodiment illustrated in FIG. 7. The tip region 29 may be recessed toward the rear end 1a in the front view of the upper surface 9. More specifically, the tip region 29 may be recessed toward the rear end 1a so as to be located closer to the rear end 1a than an imaginary straight line L1 connecting the first end 19a and the second end 21a in the front view of the upper surface 9.

If the tip region 29 is recessed toward the rear end 1a in the front view of the upper surface 9, it may be easier to set an axial rake to a small negative value than if the tip region 29 has a straight line shape. Therefore, high cutting performance is attainable while avoiding the lateral surface 13 (first lateral surface 23) of the insert 5 from coming into contact with a workpiece.

Figure 8:
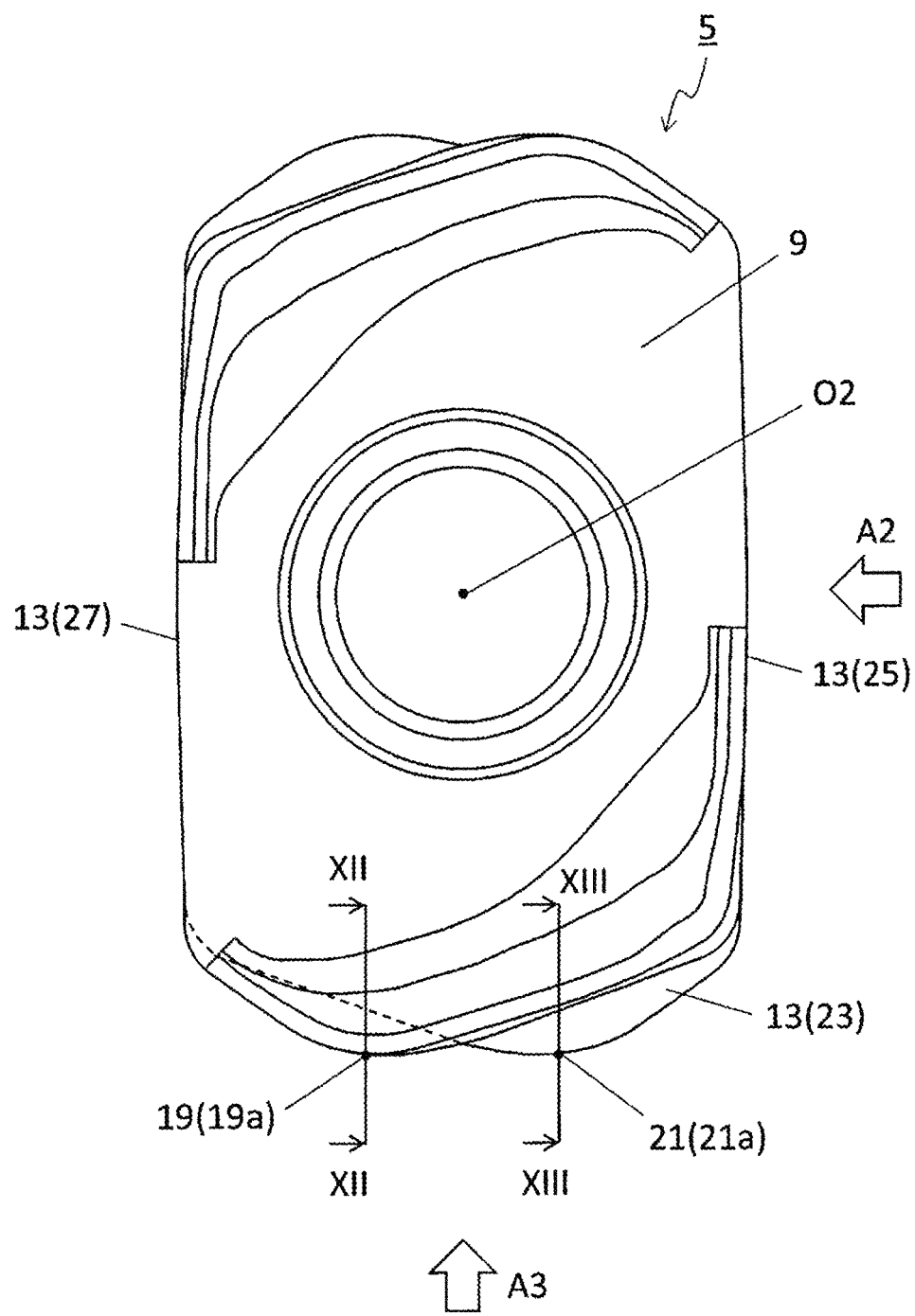
FIG. 8 is a plan view of the cutting insert illustrated in FIG. 6 as viewed from above.
Figure 12:
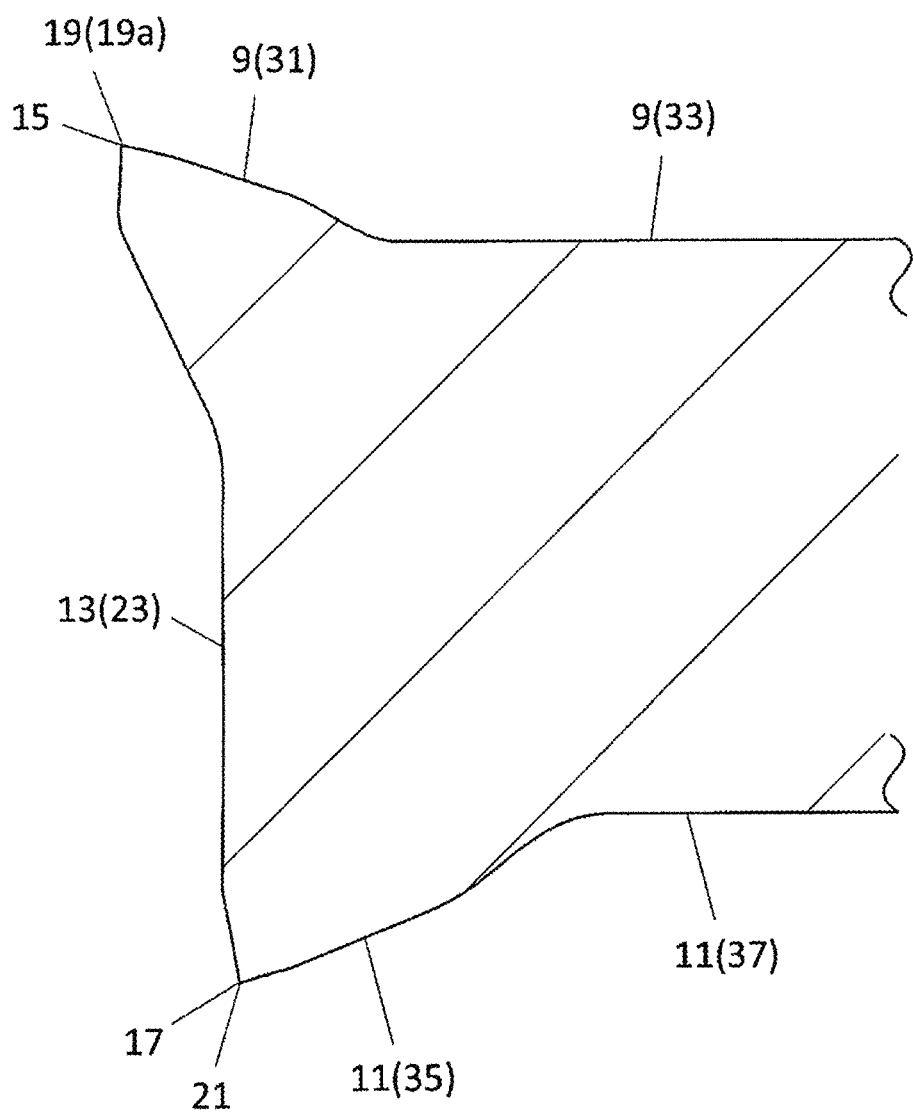
FIG. 12 is a sectional view of a cross section taken along the line XII-XII illustrated in FIG. 8.

As in a non-limiting embodiment illustrated in FIGS. 8 and 12, a cross section that passes through the first end 19a and is orthogonal to the first upper side 19 in a front view of the upper surface 9 may be a first cross section. The lateral surface 13 (first lateral surface 23) may have a concave shape in the first cross section. With this configuration, the lateral surface 13 (first lateral surface 23) may be less likely to come into contact with a workpiece.

Figure 13:
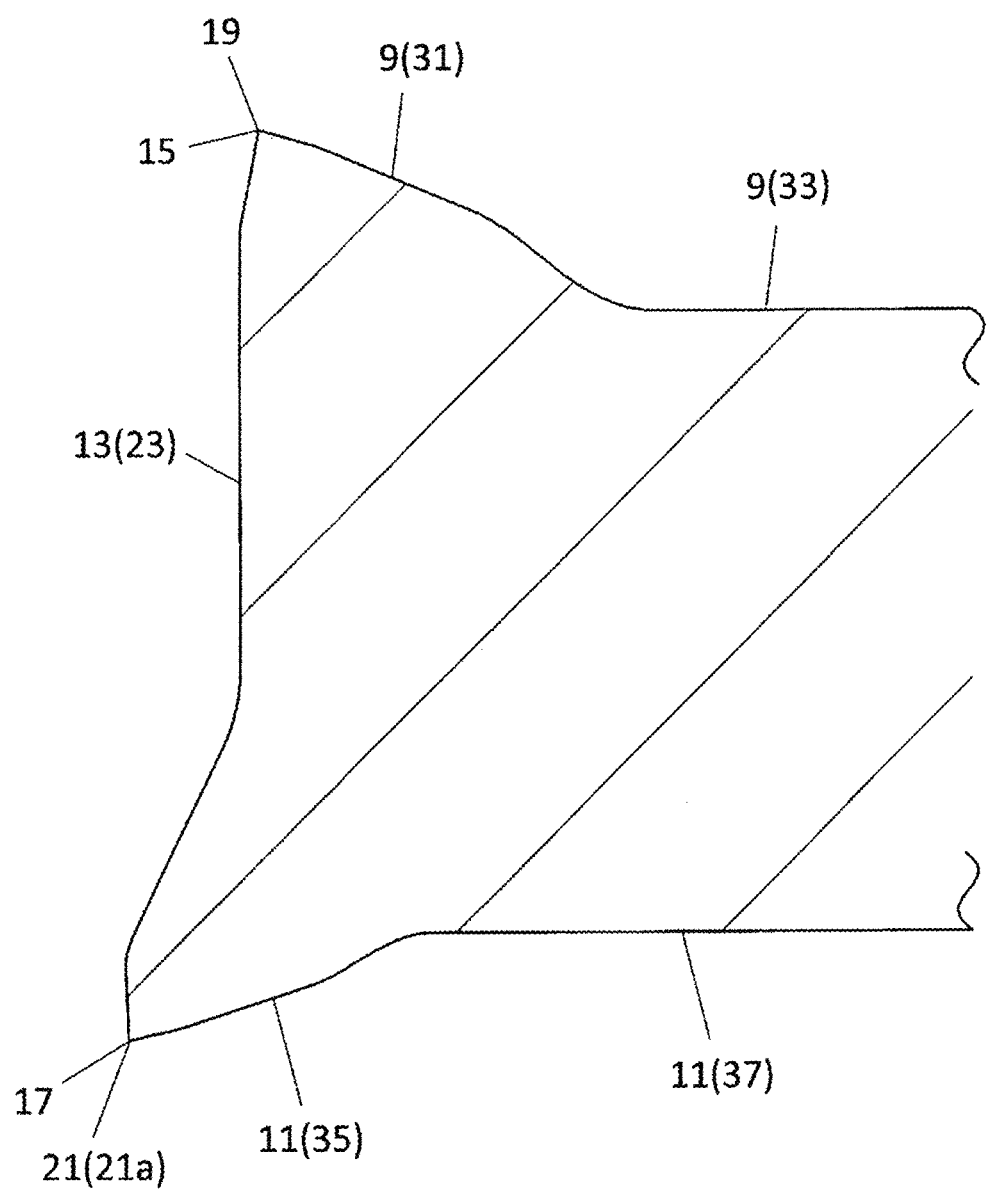
FIG. 13 is a sectional view of a cross section taken along the line XIII-XIII illustrated in FIG. 8.

As in a non-limiting embodiment illustrated in FIGS. 8 and 13, a cross section that passes through the second end 21a and is orthogonal to the first lower side 21 in the front view of the upper surface 9 may be a second cross section. The lateral surface 13 (first lateral surface 23) may have a concave shape in the second cross section. With this configuration, the lateral surface 13 (first lateral surface 23) may be less likely to come into contact with a workpiece.

Figure 11:
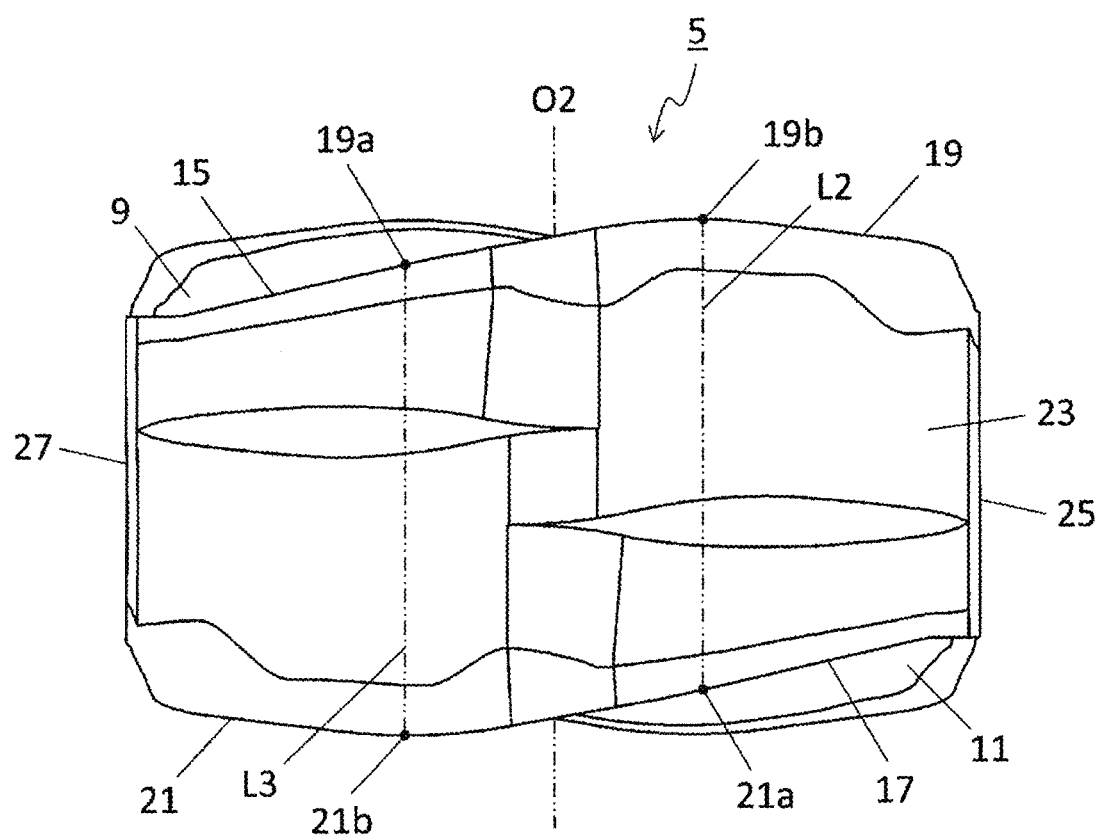
FIG. 11 is a side view of the cutting insert illustrated in FIG. 8 as viewed from an A3 direction.

As in a non-limiting embodiment illustrated in FIG. 11, the first upper side 19 may have a convex shape protruding upward in a front view (side view) of the first lateral surface 23. The first upper side 19 may include a third end 19b located most away from the lower surface 11 in the front view of the first lateral surface 23. The third end 19b may be located immediately above the second end 21a in the front view of the first lateral surface 23. With these configurations, the second end 21a may be less likely to come into contact with the workpiece because of the third end 19b if a machined product is manufactured using the upper cutting edge 15. The third end 19b may be less likely to come into contact with the workpiece because of the second end 21a if a machined product is manufactured using the lower cutting edge 17.

A positional relationship of the third end 19b with respect to the second end 21a as described above may be rephrased as follows. An imaginary straight line L2 connecting the second end 21a and the third end 19b may be parallel to the central axis O2 in the front view of the first lateral surface 23. The term "parallel" is not limited to a strict parallel, but may denote that an inclination of approximately ±5° is allowed.

The first lower side 21 may have a convex shape protruding downward in the front view of the first lateral surface 23. The first lower side 21 may include a fourth end 21b located most away from the upper surface 9 in the front view of the first lateral surface 23. The fourth end 21b may be located immediately below the first end 19a in the front view of the first lateral surface 23. With these configurations, the fourth end 21b may be less likely to come into contact with a workpiece because of the first end 19a if a machined product is manufactured using the upper cutting edge 15. The first end 19a may be less likely to come into contact with the workpiece because of the fourth end 21b if a machined product is manufactured using the lower cutting edge 17.

A positional relationship of the fourth end 21b with respect to the first end 19a as described above may be rephrased as follows. An imaginary straight line L3 connecting the first end 19a and the fourth end 21b may be parallel to the central axis O2 in the front view of the first lateral surface 23.

The upper surface 9 may include an upper inclined surface 31 and an upper flat surface 33 as in a non-limiting embodiment illustrated in FIG. 7. The upper inclined surface 31 may be located along the upper cutting edge 15. The upper inclined surface 31 may come closer to the lower surface 11 as getting further away from the upper cutting edge 15. The upper flat surface 33 may be located closer to a midportion (center) of the upper surface 9 than the upper inclined surface 31. The upper flat surface 33 may be a flat surface. The term "flat" may denote approximately flat, but need not be strictly flat.

The upper inclined surface 31 may be used as a rake surface region if a workpiece is cut out using the upper cutting edge 15. The upper flat surface 33 may be used as a surface that comes into touch (contact) with the holder 3 in cases where a workpiece is cut out using the lower cutting edge 17 and the insert 5 is fixed to the holder 3. With this configuration, the upper flat surface 33 may be positioned as a seating surface. The upper flat surface 33 may be vertical to the central axis O2. The term "vertical" is not limited to be strictly vertical, but may denote that a range of approximately 90±5° is allowed.

The upper flat surface 33 may include a fifth end 33a located on a side of the front end 1b. More specifically, the upper flat surface 33 may include the fifth end 33a located on a side closest to the front end 1b on the upper flat surface 33. The fifth end 33a may be located closer to the third lateral surface 27 than the second lateral surface 25. In other words, a distance between the fifth end 33a and the third lateral surface 27 may be smaller than a distance between the fifth end 33a and the second lateral surface 25. In cases where the upper flat surface 33 is used as the seating surface for the holder 3, the fifth end 33a may tend to be located close to the outer periphery of the rotary tool 1 if the fifth end 33a is located as described above. Hence, the insert 5 may tend to be stably held by the holder 3.

The third lateral surface 27 may be located closer to the fifth end 33a than the first end 19a. In other words, a distance between the third lateral surface 27 and the fifth end 33a may be smaller than a distance between the third lateral surface 27 and the first end 19a. In cases where the upper flat surface 33 is used as the seating surface, the insert 5 may tend to be more stably held by the holder 3 if the fifth end 33a is located as described above.

Figure 9:
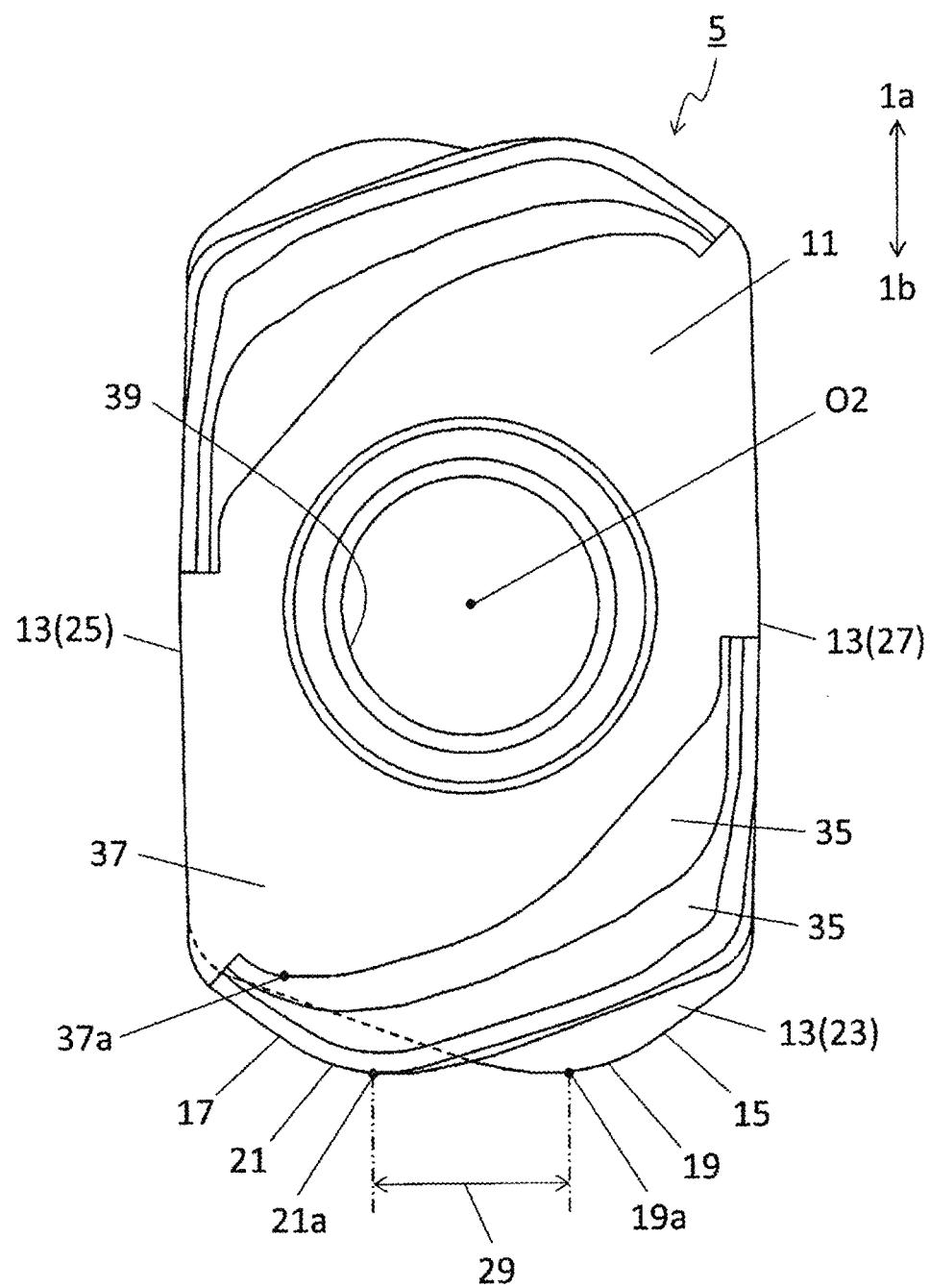
FIG. 9 is a plan view of the cutting insert illustrated in FIG. 6 as viewed from below.
Figure 10:
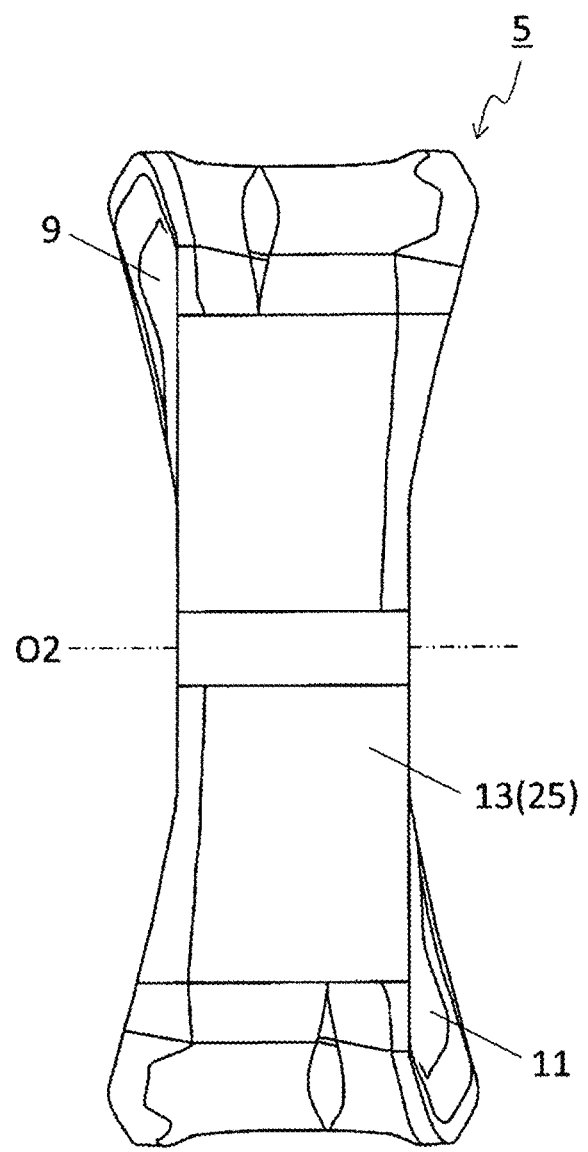
FIG. 10 is a side view of the cutting insert illustrated in FIG. 8 as viewed from an A2 direction.

The lower surface 11 may include a lower inclined surface 35 and a lower flat surface 37 as in a non-limiting embodiment illustrated in FIG. 9. The lower inclined surface 35 may be located along the lower cutting edge 17. The lower inclined surface 35 may come closer to the upper surface 9 as getting further away from the lower cutting edge 17. The lower flat surface 37 may be located closer to a midportion (center) of the lower surface 11 than the lower inclined surface 35. The lower flat surface 37 may be a flat surface.

The lower inclined surface 35 may be used as a rake surface region if a workpiece is cut out using the lower cutting edge 17. The lower flat surface 37 may be used as a surface that comes into touch (contact) with the holder 3 in cases where a workpiece is cut out using the upper cutting edge 15 and the insert 5 is fixed to the holder 3. With this configuration, the lower flat surface 37 may be positioned as a seating surface. The lower flat surface 37 may be vertical to the central axis O2.

The lower flat surface 37 may include a sixth end 37a located on a side of the front end 1b. More specifically, the lower flat surface 37 may include the sixth end 37a located on a side closest to the front end 1b on the lower flat surface 37. The sixth end 37a may be located closer to the second lateral surface 25 than the third lateral surface 27. In other words, a distance between the sixth end 37a and the second lateral surface may be smaller than a distance between the sixth end 37a and the third lateral surface 27. In cases where the lower flat surface 37 is used as the seating surface for the holder 3, the sixth end 37a may tend to be located close to the outer periphery of the rotary tool 1 if the sixth end 37a is located as described above. Hence, the insert 5 may tend to be stably held by the holder 3.

The second lateral surface 25 may be located closer to the sixth end 37a than the second end 21a. In other words, a distance between the second lateral surface 25 and the sixth end 37a may be smaller than a distance between the second lateral surface 25 and the second end 21a. In cases where the lower flat surface 37 is used as the seating surface, the insert 5 may tend to be more stably held by the holder 3 if the sixth end 37a is located as described above.

The insert 5 may include a through hole 39. The through hole 39 is usable for inserting, for example, a screw when fixing the insert 5 to the holder 3. Instead of the screw, for example, a clamp member may be used to fix the insert 5 to the holder 3.

The through hole 39 may open into regions located on opposite sides of the lateral surface 13, or alternatively may open into the upper surface 9 and the lower surface 11. The through hole 39 may open into a center of the upper surface 9 and a center of the lower surface 11 as in the non-limiting embodiment illustrated in FIG. 6. A central axis of the through hole 39 may be an imaginary straight line passing through the center of the upper surface 9 and the center of the lower surface 11. In other words, the central axis of the through hole 39 may coincide with the central axis O2 of the insert 5.

The insert 5 may be attached to the pocket 7 so that at least a part of the upper cutting edge 15 or the lower cutting edge 17 protrudes from the holder 3. For example, the insert 5 may be attached to the holder 3 so that the upper cutting edge 15 protrudes from the holder 3 toward a workpiece. In this embodiment, the lower surface 11 and the lateral surface 13 may be in contact with the holder 3.

The insert 5 may be attached to the pocket 7 with a screw 41. Specifically, the insert 5 may be attached to the holder 3 by inserting the screw 41 into the through hole 39 of the insert 5, and by inserting a front end of the screw 41 into a screw hole formed in the pocket 7 so as to fix the screw 41 to the screw hole.

For example, steel and cast iron are usable as a material of the holder 3. If the material of the holder 3 is steel, the holder 3 may have high toughness.

For example, cemented carbide and cermet are usable as a material of the insert 5. Examples of composition of the cemented carbide may include WC—Co, WC—TiC—Co and WC—TiC—TaC—Co, in which WC, TiC and TaC may be hard particles, and Co may be a binding phase.

The cermet may be a sintered composite material obtainable by compositing metal into a ceramic component. Examples of the cermet may include titanium compounds composed mainly of titanium carbide (TiC) or titanium nitride (TiN). It goes without saying that the material of the insert 5 is not limited to the above compositions.

A surface of the insert 5 may be coated with a coating film by using chemical vapor deposition (CVD) method or physical vapor deposition (PVD) method. Examples of composition of the coating film may include titanium carbide (TiC), titanium nitride (TiN), titanium carbonitride (TiCN) and alumina ($Al_2O_3$).

<Method for Manufacturing Machined Product>

A method for manufacturing a machined product 203 in a non-limiting embodiment of the present disclosure may be described below with reference to FIGS. 14 to 16.

The machined product 203 may be manufactured by carrying out a cutting process of a workpiece 201. The method for manufacturing the machined product 203 may include the following steps:

(1) rotating the rotary tool 1 represented by the above non-limiting embodiment;
(2) bringing the rotary tool 1 being rotated into contact with the workpiece 201; and
(3) moving the rotary tool 1 away from the workpiece 201.

Figure 14:
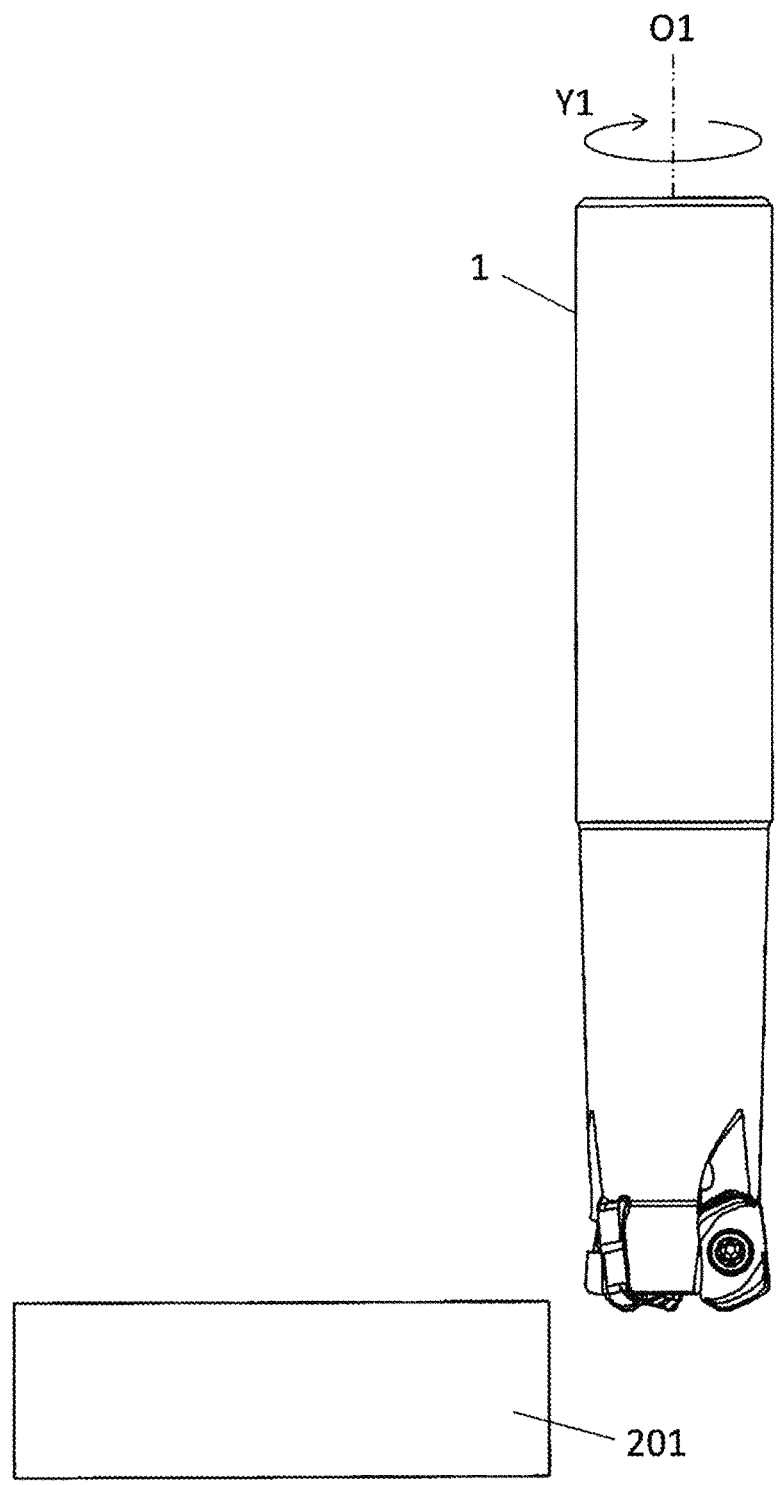
FIG. 14 is a schematic diagram illustrating one of steps in a method for manufacturing a machined product in a non-limiting embodiment of the present disclosure.

Specifically, firstly, the rotary tool 1 may be relatively brought near the workpiece 201 while rotating the rotary tool 1 around the rotation axis O1 in a Y1 direction as in a non-limiting embodiment illustrated in FIG. 14. Subsequently, the workpiece 201 may be cut out by bringing the upper cutting edge 15 of the rotary tool 1 into contact with the workpiece 201 as in a non-limiting embodiment illustrated in FIG. 15. Thereafter, the rotary tool 101 may be relatively moved away from the workpiece 201 as in a non-limiting embodiment illustrated in FIG. 16.

It may become possible to offer excellent machinability by carrying out the above processes. Specifically, if the rotary tool 1 is used in the method for manufacturing the machined product 203 in the non-limiting embodiment of the present disclosure, enhanced cutting performance is attainable while avoiding the lateral surface 13 of the insert 5 from coming into contact with the workpiece 201. It may therefore be possible to obtain the machined product 203 having a highly precise finished surface.

Figure 15:
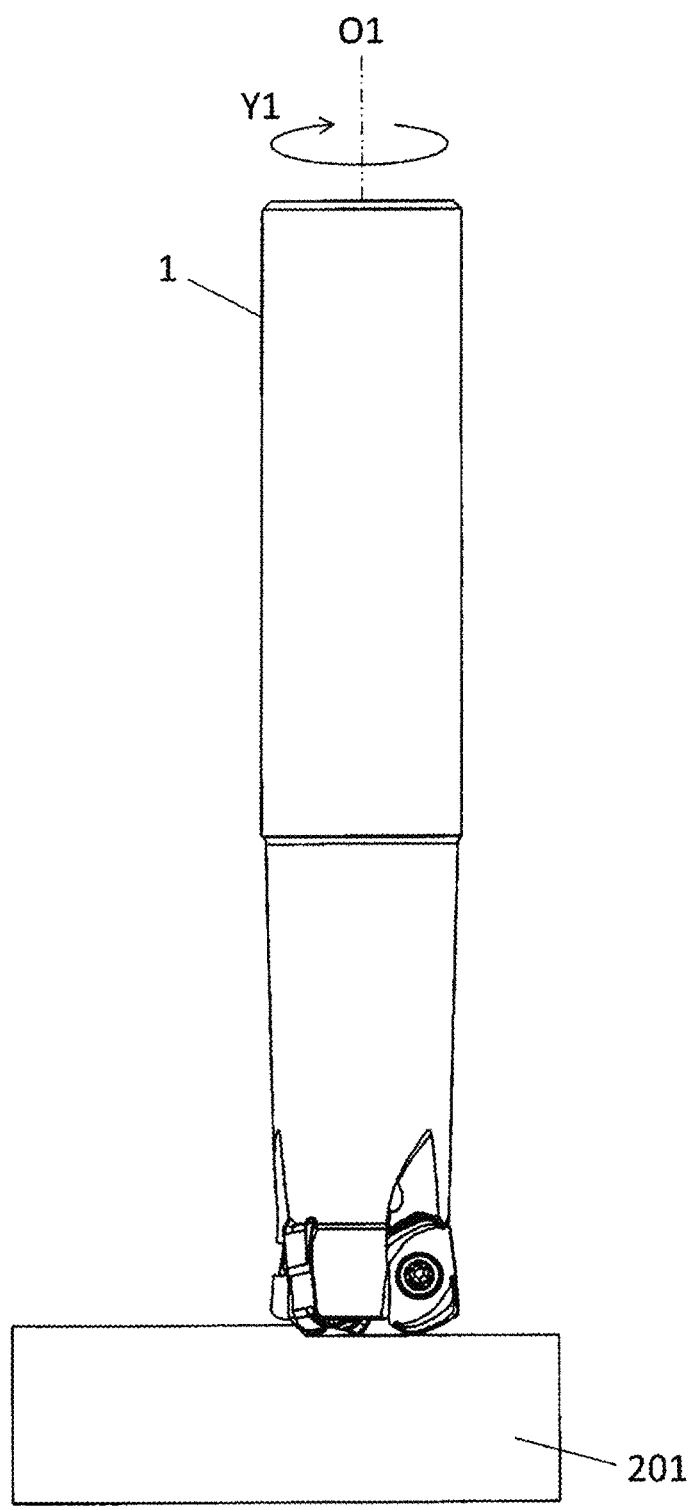
FIG. 15 is a schematic diagram illustrating one of the steps in the method for manufacturing a machined product in the non-limiting embodiment of the present disclosure.
Figure 16:
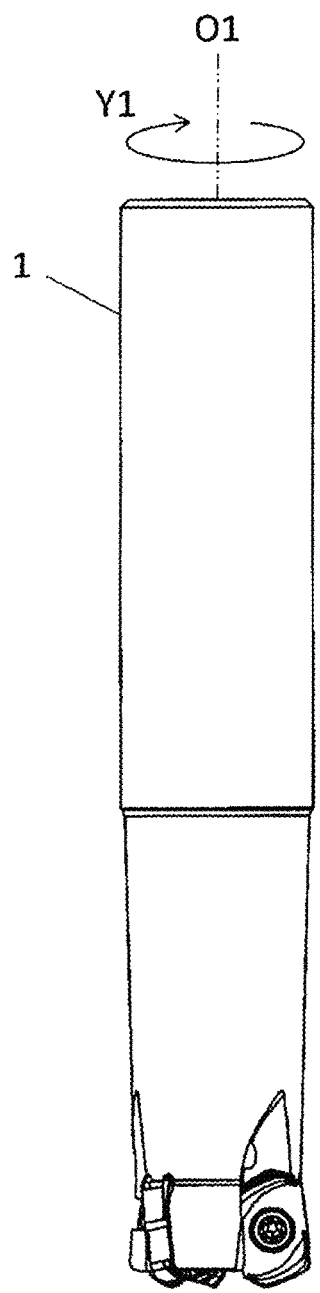
FIG. 16 is a schematic diagram illustrating one of the steps in the method for manufacturing a machined product in the non-limiting embodiment of the present disclosure.
Figure 16:

Although the workpiece 201 is fixed and the rotary tool 1 is moved in the individual processes in the non-limiting embodiment illustrated in FIGS. 14 to 16, it is not intended to limit to this embodiment.

For example, the workpiece 201 may be brought near the rotary tool 1 in the step (1). Similarly, the workpiece 201 may be moved away from the rotary tool 1 in the step (3). If it is desired to continue the cutting process, the step of bringing the upper cutting edge 15 of the insert 5 into contact with different portions of the workpiece 201 may be repeated while keeping the rotary tool 1 rotated.

Examples of material of the workpiece 201 may include carbon steel, alloy steel, stainless steel, cast iron and non-ferrous metals.

The invention claimed is:

1. A rotary tool, extending along a rotation axis from a rear end to a front end, the rotary tool comprising:
   a holder having a columnar shape extended along the rotation axis and comprising a pocket located on a side of the front end; and
   a cutting insert located in the pocket,
   the cutting insert comprising
      an upper surface which is located ahead in a rotation direction of the rotation axis and comprises a first upper side located on a side of the front end,
      a lower surface which is located on a side opposite to the upper surface and comprises a first lower side located on a side of the front end,
      a lateral surface located between the upper surface and the lower surface,
      an upper cutting edge located on the first upper side, and
      a lower cutting edge located on the first lower side,
   the lateral surface comprising
      a first lateral surface located on a side of the front end,
      a second lateral surface located on an outer peripheral side of the holder, and
      a third lateral surface located on an inner peripheral side of the holder, wherein
   the first upper side has a convex shape protruding toward the front end, and comprises a first end located on a side of the front end,
   the first end is located closer to the third lateral surface than the second lateral surface,
   the first lower side has a convex shape protruding toward the front end, and comprises a second end located on a side of the front end,
   the second end is located closer to the second lateral surface than the third lateral surface, and
   in a front view of the upper surface, the first lateral surface comprises a tip region extending from the first end to the second end, and an entirety of the tip region is recessed toward the rear end and located closer to the rear end than an imaginary straight line connecting the first end and the second end.

2. The rotary tool according to claim 1, wherein
   a cross section which passes through the first end and is orthogonal to the first upper side in the front view of the upper surface is a first cross section, and
   the lateral surface has a recessed portion in the first cross section.

3. The rotary tool according to claim 1, wherein
   a cross section which passes through the second end and is orthogonal to the first lower side in the front view of the upper surface is a second cross section, and
   the lateral surface has a recessed portion in the second cross section.

4. The rotary tool according to claim 1, wherein, in a front view of the first lateral surface,
   the first upper side has a convex shape protruding upward, and comprises a third end located most away from the lower surface, and
   the third end is located immediately above the second end.

5. The rotary tool according to claim 1, wherein, in a front view of the first lateral surface, the first lower side has a convex shape protruding downward, and comprises a fourth end located most away from the upper surface, and the fourth end is located immediately below the first end.

6. The rotary tool according to claim 1, wherein
the upper surface comprises
an upper inclined surface which is located along the upper cutting edge and comes closer to the lower surface as getting further away from the upper cutting edge, and
an upper flat surface which is flat and located closer to a midportion of the upper surface than the upper inclined surface,
the upper flat surface comprises a fifth end located on a side of the front end, and
a distance between the fifth end and the third lateral surface is smaller than a distance between the fifth end and the second lateral surface.

7. The rotary tool according to claim 6, wherein the third lateral surface is located closer to the fifth end than the first end.

8. The rotary tool according to claim 1, wherein
the lower surface comprises
a lower inclined surface which is located along the lower cutting edge and comes closer to the upper surface as getting further away from the lower cutting edge, and
a lower flat surface which is flat and located closer to a midportion of the lower surface than the lower inclined surface,
the lower flat surface comprises a sixth end located on a side of the front end, and
the sixth end is located closer to the second lateral surface than the third lateral surface.

9. The rotary tool according to claim 8, wherein the second lateral surface is located closer to the sixth end than the second end.

10. A method for manufacturing a machined product, comprising:
rotating the rotary tool according to claim 1;
bringing the rotary tool being rotated into contact with a workpiece; and
moving the rotary tool away from the workpiece.

11. The rotary tool according to claim 1, wherein
the upper surface comprises
an upper inclined surface which is located along the upper cutting edge and comes closer to the lower surface as getting further away from the upper cutting edge, and
an upper flat surface which is flat and located closer to a midportion of the upper surface than the upper inclined surface,
the upper flat surface comprises a fifth end located on a side of the front end, and
the fifth end is located closest to the front end on the upper flat surface.

12. A rotary tool, extending along a rotation axis from a rear end to a front end, comprising:
a holder having a columnar shape extended along the rotation axis and comprising a pocket located on a side of the front end; and
a cutting insert located in the pocket,
the cutting insert comprising
an upper surface which is located ahead in a rotation direction of the rotation axis and comprises a first upper side located on a side of the front end,
a lower surface which is located on a side opposite to the upper surface and comprises a first lower side located on a side of the front end,
a lateral surface located between the upper surface and the lower surface,
an upper cutting edge located on the first upper side, and
a lower cutting edge located on the first lower side,
the lateral surface comprising
a first lateral surface located on a side of the front end,
a second lateral surface located on an outer peripheral side of the holder, and
a third lateral surface located on an inner peripheral side of the holder, wherein
the first upper side has a convex shape protruding toward the front end, and comprises a first end located on a side of the front end,
the first end is located closer to the third lateral surface than the second lateral surface,
the first lower side has a convex shape protruding toward the front end, and comprises a second end located on a side of the front end,
the second end is located closer to the second lateral surface than the third lateral surface, and
in a front view of the upper surface, the first lateral surface comprises a tip region extending from the first end to the second end, the tip region being recessed toward the rear end,
in a front view of the first lateral surface,
the first upper side has a convex shape protruding upward, and comprises a third end located most away from the lower surface, and
the third end is located immediately above the second end,
a cross section which passes through the second end and is orthogonal to the first lower side in the front view of the upper surface is a second cross section, and
the lateral surface has a recessed portion in the second cross section.

13. The rotary tool according to claim 12, wherein
a cross section which passes through the first end and is orthogonal to the first upper side in the front view of the upper surface is a first cross section, and
the lateral surface has a recessed portion in the first cross section.

14. The rotary tool according to claim 12, wherein, in a front view of the first lateral surface,
the first lower side has a convex shape protruding downward, and comprises a fourth end located most away from the upper surface, and
the fourth end is located immediately below the first end.

15. The rotary tool according to claim 12, wherein
the upper surface comprises
an upper inclined surface which is located along the upper cutting edge and comes closer to the lower surface as getting further away from the upper cutting edge, and
an upper flat surface which is flat and located closer to a midportion of the upper surface than the upper inclined surface,
the upper flat surface comprises a fifth end located on a side of the front end, and
a distance between the fifth end and the third lateral surface is smaller than a distance between the fifth end and the second lateral surface.

16. The rotary tool according to claim 15, wherein the third lateral surface is located closer to the fifth end than the first end.

17. The rotary tool according to claim 12, wherein
the upper surface comprises
  an upper inclined surface which is located along the upper cutting edge and comes closer to the lower surface as getting further away from the upper cutting edge, and
  an upper flat surface which is flat and located closer to a midportion of the upper surface than the upper inclined surface,
the upper flat surface comprises a fifth end located on a side of the front end, and
the fifth end is located closest to the front end on the upper flat surface.

18. The rotary tool according to claim 12, wherein
the lower surface comprises
  a lower inclined surface which is located along the lower cutting edge and comes closer to the upper surface as getting further away from the lower cutting edge, and
  a lower flat surface which is flat and located closer to a midportion of the lower surface than the lower inclined surface,
the lower flat surface comprises a sixth end located on a side of the front end, and
the sixth end is located closer to the second lateral surface than the third lateral surface.

19. The rotary tool according to claim 18, wherein the second lateral surface is located closer to the sixth end than the second end.

20. A method for manufacturing a machined product, comprising:
  rotating the rotary tool according to claim 12;
  bringing the rotary tool being rotated into contact with a workpiece; and
  moving the rotary tool away from the workpiece.

21. A rotary tool, extending along a rotation axis from a rear end to a front end, comprising:
  a holder having a columnar shape extended along the rotation axis and comprising a pocket located on a side of the front end; and
  a cutting insert located in the pocket,
the cutting insert comprising
  an upper surface which is located ahead in a rotation direction of the rotation axis and comprises a first upper side located on a side of the front end,
  a lower surface which is located on a side opposite to the upper surface and comprises a first lower side located on a side of the front end,
  a lateral surface located between the upper surface and the lower surface,
  an upper cutting edge located on the first upper side, and
  a lower cutting edge located on the first lower side,
the lateral surface comprising
  a first lateral surface located on a side of the front end,
  a second lateral surface located on an outer peripheral side of the holder, and
  a third lateral surface located on an inner peripheral side of the holder, wherein
the first upper side has a convex shape protruding toward the front end, and comprises a first end located on a side of the front end,
the first end is located closer to the third lateral surface than the second lateral surface,
the first lower side has a convex shape protruding toward the front end, and comprises a second end located on a side of the front end,
the second end is located closer to the second lateral surface than the third lateral surface, and
in a front view of the upper surface, the first lateral surface comprises a tip region extending from the first end to the second end, the tip region being recessed toward the rear end,
in a front view of the first lateral surface,
  the first upper side has a convex shape protruding upward, and comprises a third end located most away from the lower surface, and
  the third end is located immediately above the second end,
a cross section which passes through the first end and is orthogonal to the first upper side in the front view of the upper surface is a first cross section, and
the lateral surface has a recessed portion in the first cross section.

* * * * *